July 26, 1932.  C. J. RODMAN ET AL  1,868,917
METHOD AND APPARATUS FOR PURIFYING OIL
Filed Dec. 30, 1929
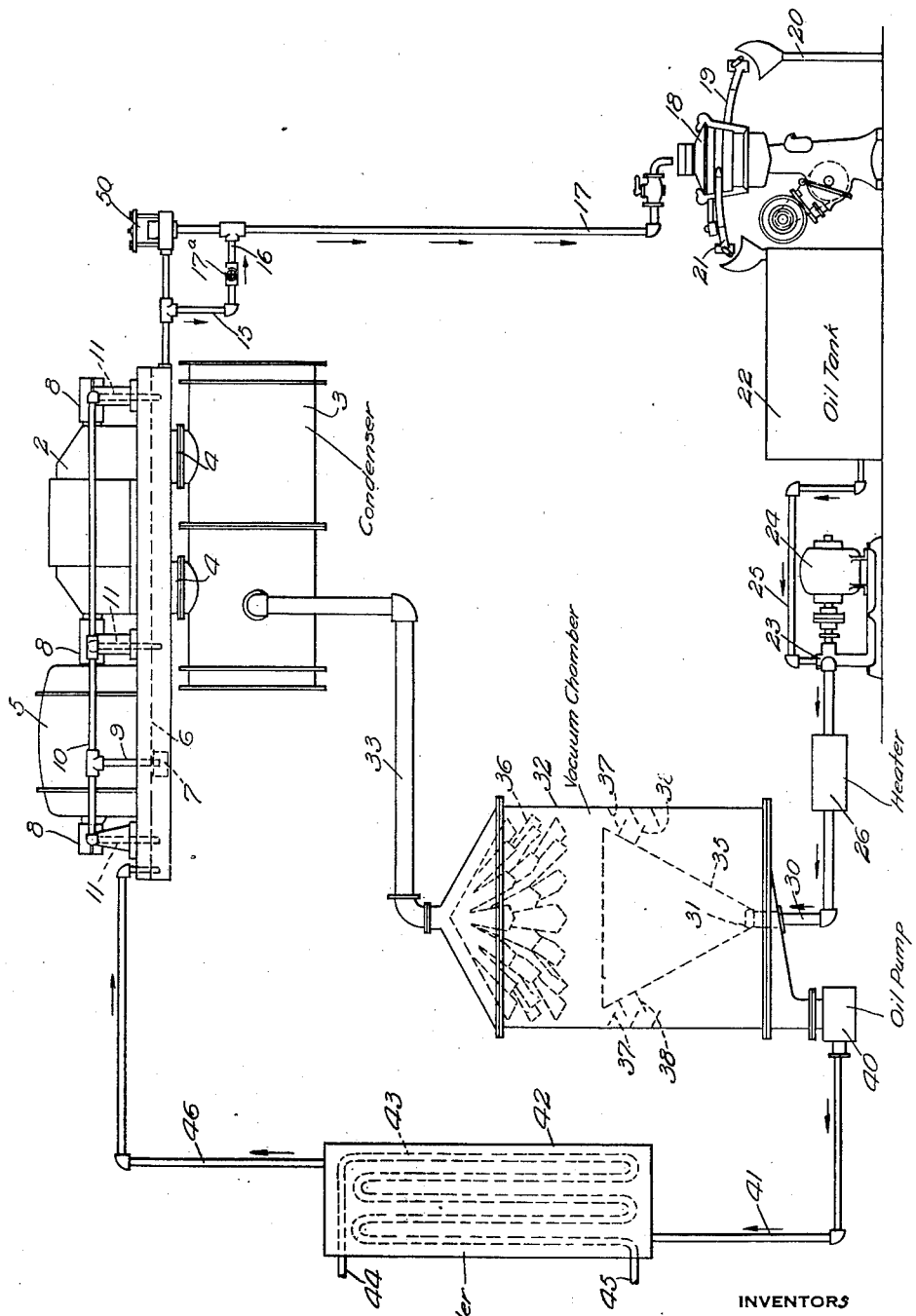
INVENTORS
Clarence J. Rodman
Russell P. Dunmire
by Byrnes, Stebbins, Parmelee & Blenko
Attys.

Patented July 26, 1932

1,868,917

UNITED STATES PATENT OFFICE

CLARENCE J. RODMAN AND RUSSELL P. DUNMIRE, OF ALLIANCE, OHIO, ASSIGNORS TO THE BUCKEYE TWIST DRILL COMPANY, OF ALLIANCE, OHIO, A CORPORATION OF OHIO

METHOD AND APPARATUS FOR PURIFYING OIL

Application filed December 30, 1929. Serial No. 417,356.

This invention relates generally to a method and apparatus for purifying oils, and more particularly to a method and apparatus especially adapted for purifying oils which have been used to lubricate the bearings of an engine.

It has been proposed heretofore to purify used lubricating oils by centrifuging, and to then return the oil which has been treated in the centrifugal separator to the oil distributing system. The treatment of oil in a centrifugal separator is effective for separating solids and free water, but it does not remove dissolved gases and moisture from the oil. Furthermore, centrifugal separators are open to the atmosphere and for this reason are open to the objection that they aerate the oil causing the formation of oxidation products.

In accordance with our invention we first treat the used lubricating oil in a centrifugal separator in order to separate the solids and free water, and then the oil which has been aerated and partially oxidized in the centrifugal separator is further treated in a vacuum chamber in order to remove dissolved gases and water. After leaving the centrifugal separator the oil is heated and delivered at elevated pressure to a spray nozzle within the vacuum chamber from whence it issues in the form of a fine spray. The sprayed oil is collected by baffles and the dissolved water which has been transformed from a liquid into a gas when the oil is sprayed into the vacuum chamber, and the dissolved gases are allowed to escape from the vacuum chamber. The oil flows in a tortuous path while under the action of the vacuum and is pumped from the bottom of the vacuum chamber through a cooler and returned to the oil distributing system which supplies lubricant to the bearings of the engine.

The accompanying drawing illustrates in a diagrammatic manner one embodiment of the invention showing oil purifying apparatus connected to the oil distribution system which lubricates the bearings of a turbo-generator set.

Referring more particularly to the drawing, a turbine 2 having a condenser 3 connected thereto by conduits 4 drives a generator 5. The turbo-generator set has an oil reservoir 6 underneath it from which oil is pumped by a pump 7 to the bearings 8 of the turbine and generator. The oil flows from the reservoir 6 through a conduit 9 to a conduit 10 into the bearings 8. It returns from the bearings through conduits 11 to the reservoir 6. The oil in the reservoir 6 is conveyed through conduits 15, 16 and 17 to a centrifugal separator 18. The separator separates the solids and free water from the oil, the impurities being delivered through a pipe 19 to a waste pipe 20, and the oil which has been freed from solids and free water is delivered through a pipe 21 to an oil tank 22.

The oil in tank 22 is forced by a pump 23 driven by a motor 24 through conduit 25 to a heater 26. The heater is regulated so that the oil is heated to a temperature of between 90° and 160° F., preferably to a temperature of about 150° F. The pump should produce an oil pressure of at least 40 pounds per square inch in order that an effective separation of the dissolved water and gases can be obtained in the vacuum chamber which is hereinafter more fully described. The vacuum chamber preferably is maintained under a vacuum of at least 28 inches as referred to a 30 inch barometer.

The oil which has been heated is conveyed through a conduit 30 and delivered to a spray nozzle 31 located adjacent the bottom of a vacuum chamber 32. The vacuum chamber is connected adjacent its top through a conduit 33 with the condenser 3 of the turbine. As the exhaust steam from the turbine condenses in the condenser 3 it forms a partial vacuum, and this partial vacuum, because of the conduit 33, maintains the chamber 32 under a partial vacuum. The oil issuing from the nozzle 31 in the form of a fine spray is guided upwardly by a conical baffle 35 into contact with a series of trough-shaped baffles 36 at the top of the vacuum chamber. In the drawing, three series of baffles 36 are shown and the arrangement is such that the baffles in the middle series are in staggered relationship with the series of baffles immediately above and immediately below the middle series. The oil sprayed from nozzle 31 into the vacuum chamber is subjected to a sudden shock which releases the dissolved gases and water. The liquid spray is collected by the baffles 36 but the vapors flow in tortuous passages to the exhaust conduit 33 from which they are delivered to the condenser 3. The oil collected by the baffles 36 flows downwardly by gravity and is caused to flow in a tortuous path by the baffles 37 and 38. In its travel to the bottom of the tank, the oil is subjected to the action of the vacuum which completely removes the dissolved gases and moisture.

The oil which has been treated in the vacuum chamber is pumped from the bottom of the chamber by a pump 40 through conduit 41 into a cooler 42. The cooler is provided with cooling coils 43 having water inlet and outlet connections 44 and 45. The purified cooled oil is returned to the reservoir 6 through conduit 46.

A sight-flow indicator 50 is provided in the connections between the reservoir 6 and the conduit 17 leading to the centrifugal separator, in order to determine the height of the oil in the reservoir 6. The conduit 16 is provided with a valve 17$^a$ which may be closed in order to cause flow of the oil through the sight-flow indicator 50.

The provision of a centrifugal separator which separates solids and free water from the used oil, together with a vacuum chamber into which the oil is sprayed at elevated pressure and temperature in order to separate the dissolved water and gases from the oil, results in an oil which is superior in lubricating properties to an oil treated in a centrifugal separator alone. When the heated oil is sprayed under elevated pressure into the vacuum chamber it is subjected to a sudden shock which causes the dissolved gases and moisture to separate from the particles of oil. The treatment in the vacuum chamber also eliminates the oxidation products caused by aeration of the oil while in the centrifugal separator. The oil, after leaving the vacuum chamber, is cooled to a temperature at which it will effectively lubricate the bearings of the engine.

The purifying apparatus, according to our invention, can be applied not only to a turbo-generator set provided with a condenser which provides a source of vacuum, but may be applied to any oil distributing system having a source of vacuum available. For example, the conduit 33 which conducts the gases away from the vacuum chamber may be connected to the intake manifold of a Diesel engine, or to any other suitable source of vacuum.

We have illustrated and described one embodiment of our invention and have also indicated the temperatures and pressures at which it is desired to treat the oil. It should be understood, however, that the invention may be otherwise embodied or practiced within the scope of the following claims.

We claim:

1. In an oil distributing system for lubricating the bearings of an engine, the combination with a condenser connected to the engine, of a vacuum chamber connected to said condenser, a centrifugal separator, and means for conveying oil from the engine through the centrifugal separator and vacuum chamber and returning it to the engine.

2. In an oil distributing system for lubricating the bearings of an engine, the combination with a condenser connected to the engine, of a vacuum chamber connected to said condenser, a centrifugal separator, a cooler, and means for conveying oil from the engine through the centrifugal separator and vacuum chamber and cooler and returning it to the engine.

3. In an oil distributing system for lubricating the bearings of an engine, the combination with a condenser connected to the engine, of a vacuum chamber connected to said condenser, said vacuum chamber having baffles therein for preventing escape of oil but allowing escape of gas from the chamber, a centrifugal separator, and means for conveying oil from the engine through the centrifugal separator and vacuum chamber and returning it to the engine.

4. In an oil distributing system for lubricating the bearings of an engine, the combination with a condenser connected to the engine, of a vacuum chamber connected to said condenser, the vacuum chamber having a spray nozzle arranged to spray oil upwardly in the chamber and baffles adjacent its top which prevent escape of oil but allow escape of gas from the chamber, a centrifugal separator, and means for conveying oil from the engine through the centrifugal separator and vacuum chamber and returning it to the engine.

5. In an oil distributing system for lubricating the bearings of an engine, the combination with a condenser connected to the engine, of a vacuum chamber connected to said condenser, said vacuum chamber having a spray nozzle arranged to spray oil upwardly in the chamber and baffles adjacent its top which collect oil but allow escape of gas from the chamber, and other baffles disposed adjacent the sides of the chamber for causing the collected oil to flow in a tortuous path to the bottom of the chamber, a centrifugal separator, and means for conveying oil from the engine through the centrifugal separator and vacuum chamber and returning it to the engine.

6. In an oil distributing system for lubricating the bearings of an engine, the combination with a condenser connected to the engine of a vacuum chamber connected to said condenser, said vacuum chamber having a spray nozzle arranged to spray oil upwardly in the chamber and baffles adjacent the top of the chamber which collect oil but allow escape of gas from the chamber, other baffles disposed adjacent the sides of the vacuum chamber for causing the collected oil to flow in a tortuous path to the bottom of the chamber, a centrifugal separator, a cooler, and means for conveying oil from the engine through the centrifugal separator and vacuum chamber and cooler, and returning it to the engine.

In testimony whereof we have hereunto set our hands.

CLARENCE J. RODMAN.
RUSSELL P. DUNMIRE.